Patented Sept. 4, 1951

2,566,924

UNITED STATES PATENT OFFICE 2,566,924

ONE-PHASE ANTIRUST LIQUID CONTAINING AN ALKALI METAL BORATE AND A LONG-CHAIN ALCOHOL

Lloyd M. Burghart, Darien, Conn., assignor, by mesne assignments, to National Distillers Products Corporation, New York, N. Y., a corporation of Virginia No Drawing. Application November 13, 1947, Serial No. 785,827

16 Claims. (Cl. 252—74)

This invention relates to one-phase, liquid antirust concentrates, and more particularly to such concentrates which are suitable for packaging in small units sized for convenient treatment of individual pieces of equipment, such as automobile radiators, etc.

It has become quite generally recognized that protection of an automobile radiator against corrosion during summer driving is just as important as the use of a properly inhibited antifreeze solution (e. g., ethylene glycol) in winter driving. Generally speaking, any inhibitor or combination of inhibitors contained in an antifreeze may be expected to yield as good corrosion protection if supplied to the water used in a radiator during the summer season. That this is true may be inferred from the fact that most antifreeze producers have at one time or another attempted to market some form of concentrate of the antirust ingredient or ingredients which they add to their antifreeze solutions.

If the corrosion inhibitor is a single chemical compound, whether liquid or solid, the preparation of suitable unit packages is a simple and obvious matter. If the inhibitor is a composition and the individual components are solid, the preparation of a unit package is practically as easy as for the preceding. If a liquid antirust composed of mixed inhibitors is to be prepared and the individual components are known to be soluble in a specified common solvent, there is still little difficulty in marketing the antirust as a one-phase product. If, however, the inhibitor components are unlike in type (i. e., both organic and inorganic) and are not known to be soluble in any common solvent, a field for extensive experiment opens up when one attempts to prepare a highly concentrated one-phase product containing such components.

It is therefore an object of this invention to prepare a one-phase, liquid antirust concentrate containing unlike types of corrosion inhibitors.

It is also an object of this invention to prepare a one-phase, liquid antirust concentrate containing an alkali metal borate, an alkali metal nitrite and a long-chain alcohol (film-former).

The aforementioned and other objects are accomplished in accordance with this invention by mixing the alkali metal borate, alkali metal nitrite and long-chain alcohol in a solvent which consists of a mixture of ethylene glycol or propylene glycol and isopropanol, n-butanol or tert.-butanol.

For example, a composition falling within the scope of the present invention may be prepared by adding 2.95 gms. of sodium nitrite (40% solution in water), 16.02 gms. of sodium metaborate (40% solution in water), 3.56 gms. of sodium tetraborate (40% solution in water) and 11.99 gms. of lauryl alcohol to a mixture consisting of 80.92 ml. of propylene glycol and 19.08 ml. of n-butanol at room temperature, and thereafter stirring the mixture until it is uniform.

Various modifications may be made in the specific composition just described to provide a one-phase liquid antirust concentrate. Thus, the relative proportions of the glycol and the alcohol may be varied so that the organic solvent portion of the concentrate contains from about 65 to about 95% by volume of ethylene glycol or propylene glycol (or mixtures thereof) and from about 5 to about 35% by volume of i-propanol, n-butanol or tert.-butanol (or mixtures thereof). In addition, the aqueous solution of sodium nitrite employed may be replaced by anhydrous sodium nitrite, and the sodium nitrite may be replaced by an equal weight of other alkali metal nitrites, such as lithium nitrite or potassium nitrite. In general, the composition should contain from about 0.005 to about 0.05 gm. of alkali metal nitrite per ml. of glycol-alcohol solvent.

Furthermore, in place of the sodium metaborate and sodium tetraborate solutions employed in the specific example, there may be substituted anhydrous sodium metaborate and anhydrous sodium tetraborate, respectively. In addition, it is not necessary that a mixture of sodium metaborate and sodium tetraborate be contained in the antirust concentrate; hence, the borate portion of the composition may consist entirely of metaborate or tetraborate. Moreover, the sodium metaborate or tetraborate may be formed in situ in the composition by adding thereto orthoboric acid and sodium hydroxide in their proper proportions. It is furthermore not essential that the borate portion of the composition be in the form of the sodium salt, since other alkali metal metaborates or tetraborates, such as lithium metaborate or potassium tetraborate, may also be utilized. As a general rule, the composition of the present invention should be as highly concentrated as possible with respect to its content of alkali metal metaborate or tetraborate. Hence, the composition should contain at least about 0.10, and preferably at least about 0.15, gm. of alkali metal metaborate or tetraborate per ml. of glycol-alcohol solvent. The upper limit of concentration of the alkali metal metaborate or tetraborate will depend upon the other ingredients in the composition and their relative proportions. As a general rule, however, the practical upper limit of the alkali metal metaborate or tetraborate concentration which may be employed in a one-phase concentrate is about 0.25 gm. of alkali metal metaborate or tetraborate per ml. of glycol-alcohol solvent.

In the specific composition which has been described, lauryl alcohol was incorporated therein as a film-forming agent which is thrown out of solution when the composition is diluted with large amounts of water. It is not essential, however, that lauryl alcohol be the specific film-forming agent incorporated into the composition, and for that specific alcohol there may be substituted an equal weight of any saturated, aliphatic, monohydric alcohol having from eight to fourteen carbon atoms, such as n-octyl alcohol, 2-ethylhexanol, 2-heptanol, n-decyl alcohol or n-tetradecyl alcohol, or preferably mixtures thereof. The amount of film-formers incorporated into the composition may also be varied over a wide range, such range in general being from about 0.05 to about 0.25 gm. of long-chain alcohol per ml. of glycol-alcohol solvent.

The composition of the present invention is essentially a solution of three corrosion inhibitors (alkali metal nitrite, alkali metal metaborate or tetraborate, and long-chain alcohol) dissolved in a mixture of solvents (ethylene glycol or propylene glycol and i-propanol, n-butanol or tert.-butanol). The composition may, however, contain certain amounts of other ingredients which do not detract from its utility or advantageous properties, such as dyes or water, the latter of which may generally be present in an amount up to about 0.50 gm. per ml. of glycol-alcohol solvent.

The composition described herein is a valuable composition of matter in that it is one-phase and hence can be easily dispensed, and also in that about one-half pint thereof will satisfactorily inhibit the corrosion in the average automobile radiator (4 gal. capacity). Furthermore, as will be apparent to those skilled in the art, the composition may be added to heat transfer fluids (e. g., water, monohydric aliphatic alcohols or polyhydric aliphatic alcohols, or mixtures of such alcohols with water) used in a wide variety of other heat transfer apparatus.

I claim:

1. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 0.25 gm. of an alkali metal metaborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

2. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.25 gm. of an alkali metal metaborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

3. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.25 gm. of an alkali metal metaborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

4. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.25 gm. of sodium metaborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

5. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.25 gm. of sodium metaborate per ml. of glycol-alcohol solvent, and from about 0.05 gm. to about 0.25 gm. of lauryl alcohol per ml. of glycol-alcohol solvent.

6. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 0.25 gm. of an alkali metal tetraborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

7. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.25 gm. of an alkali metal tetraborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

8. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.25 gm. of an alkali metal tetraborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

9. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.25 gm. of sodium tetraborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

10. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.25 gm. of sodium tetraborate per ml. of glycol-alcohol solvent, and from about 0.05 gm. to about 0.25 gm. of lauryl alcohol per ml. of glycol-alcohol solvent.

11. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 0.25 gm. of a mixture of alkali metal metaborates and tetraborates per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

12. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.25 gm. of a mixture of alkali metal metaborates and tetraborates per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

13. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycohol-alcohol solvent, from about 0.10 gm. to about 0.25 gm. of a mixture of alkali metal metaborates and tetraborates per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

14. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.25 gm. of a mixture of sodium metaborate and tetraborate per ml. of glycol-alcohol solvent, and from about 0.05 gm. to about 0.25 gm. of a saturated, aliphatic, monohydric alcohol having from eight to fourteen carbon atoms per ml. of glycol-alcohol solvent.

15. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.25 gm. of a mixture of sodium metaborate and tetraborate per ml. of glycol-alcohol solvent, and from about 0.05 gm. to about 0.25 gm. of lauryl alcohol per ml. of glycol-alcohol solvent.

16. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of at least one material selected from the group consisting of ethylene glycol and propylene glycol and from about 5 to about 35% by volume of at least one material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 0.25 gm. per ml. of glycol-alcohol solvent of at least one material selected from the group consisting of alkali metal metaborates and tetraborates, and from about 0.05 gm. to about 0.25 gm. of at least one saturated, aliphatic, monohydric alcohol having from eight to fourteen carbon atoms per ml. of glycol-alcohol solvent.

LLOYD M. BURGHART.

REFERENCES CITED

The following references are of record in the file of this patent:

UNITED STATES PATENTS

| Number | Name | Date |
|---|---|---|
| 2,126,173 | Clapsadle et al. | Aug. 9, 1938 |
| 2,264,362 | Clapsadle | Dec. 2, 1941 |
| 2,386,182 | Balcar | Oct. 9, 1945 |